US008880216B2

(12) United States Patent
Izumi et al.

(10) Patent No.: US 8,880,216 B2
(45) Date of Patent: Nov. 4, 2014

(54) PICKING SYSTEM

(75) Inventors: Tetsuro Izumi, Kitakyushu (JP);
Kenichi Koyanagi, Kitakyushu (JP);
Kenji Matsukuma, Kitakyushu (JP);
Yukio Hashiguchi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 133 days.

(21) Appl. No.: 13/338,169

(22) Filed: Dec. 27, 2011

(65) Prior Publication Data
US 2012/0323357 A1    Dec. 20, 2012

(30) Foreign Application Priority Data

Jun. 20, 2011   (JP) .................................. 2011-136329

(51) Int. Cl.
*G06F 7/00*      (2006.01)
*B25J 9/16*      (2006.01)
*G05B 19/418*    (2006.01)

(52) U.S. Cl.
CPC ........... *G05B 19/4182* (2013.01); *B25J 9/1697* (2013.01)
USPC ........................... 700/228; 700/245; 198/395

(58) Field of Classification Search
USPC ......................................................... 700/228
See application file for complete search history.

(56) References Cited

U.S. PATENT DOCUMENTS

| 5,370,216 A | * | 12/1994 | Tsuruyama et al. | ........... 198/395 |
| 6,360,142 B1 | * | 3/2002 | Miura et al. | ................... 700/245 |
| 2005/0107918 A1 | * | 5/2005 | Watanabe et al. | ............. 700/245 |
| 2013/0151007 A1 | * | 6/2013 | Valpola et al. | ................ 700/245 |

FOREIGN PATENT DOCUMENTS

| EP | 0613841 | | 9/1994 | | |
| EP | 0613841 | A1 * | 11/1994 | ............. | B65G 47/14 |
| JP | 6-329235 | | 11/1994 | | |
| JP | 3314890 | B2 | 11/1994 | | |
| JP | 06329235 | A * | 11/1994 | ............. | B65G 47/14 |
| JP | H07277484 | A * | 10/1995 | ............... | B25J 13/00 |
| JP | 08-323669 | | 12/1996 | | |
| JP | 10-249765 | | 9/1998 | | |
| JP | 2002-037441 | | 2/2002 | | |
| JP | 2002-113678 | | 4/2002 | | |
| JP | 2011-000685 | | 1/2011 | | |

OTHER PUBLICATIONS

Japanese Office Action for corresponding JP Application No. 2011-136329, Jul. 23, 2013.
Extended European Search Report for corresponding EP Application No. 12151010.1-1239, May 4, 2012.
Japanese Decision of a Patent Grant for corresponding JP Application No. 2011-136329, Jan. 7, 2014.
Chinese Office Action for corresponding CN Application No. 201210017525.0, Jul. 22, 2014.

* cited by examiner

*Primary Examiner* — Gene Crawford
*Assistant Examiner* — Kyle Logan
(74) *Attorney, Agent, or Firm* — Mori & Ward, LLP

(57) ABSTRACT

A picking system includes a conveyer, a robot, and a control device. The conveyer conveys workpieces. The robot includes a plurality of holding parts and a supporting part. The holding parts hold the workpieces. The supporting part is rotatably provided against an arm to support the plurality of holding parts. Then, the control device instructs the robot to rotate the supporting part by a predetermined amount in such a manner that the direction of the workpiece becomes a predetermined direction for each the workpiece held by the holding parts and then to place the workpiece on a predetermined place.

5 Claims, 6 Drawing Sheets

PICKING SYSTEM

CROSS-REFERENCE TO RELATED APPLICATION

This application is based upon and claims the benefit of priority of the prior Japanese Patent Application No. 2011-136329, filed on Jun. 20, 2011, the entire contents of which are incorporated herein by reference.

FIELD

The embodiments discussed herein are directed to a picking system.

BACKGROUND

A picking system, which simultaneously moves a plurality of workpieces to other places by using a robot that includes a plurality of holding parts for holding the workpieces, has been known as disclosed in, Japanese Patent No. 3314890. The picking system aligns the directions of the workpieces in a predetermined direction and holds the aligned workpieces when holding the plurality of workpieces.

SUMMARY

A picking system according to an aspect of embodiments includes a conveying device, a robot, and a control device. The conveying device conveys workpieces. The robot performs a holding operation for holding the workpieces conveyed by the conveying device and a placement operation for moving the held workpieces to place the workpieces on a predetermined place. The control device instructs the robot to perform the holding operation and the placement operation. Moreover, the robot includes a plurality of holding parts and a supporting part. The holding parts hold the workpieces. The supporting part is rotatably provided against an arm to support the plurality of holding parts. The control device instructs the robot to rotate the supporting part by a predetermined amount in such a manner that a direction of the workpiece becomes a predetermined direction for each the workpiece held by the holding parts and then to perform the placement operation for placing the workpiece on the predetermined place.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

First Embodiment

Figure 1:
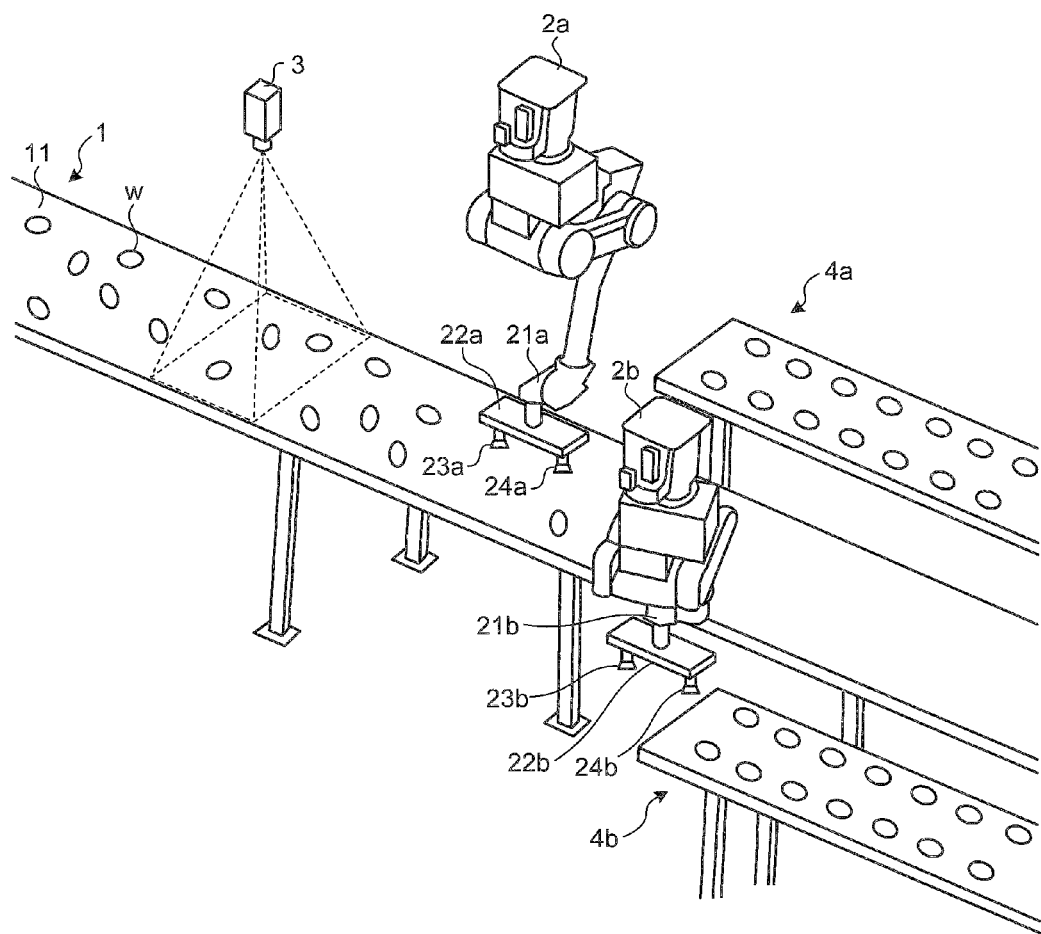
FIG. 1 is a pattern perspective view of a picking system according to a first embodiment.

First, an appearance of a picking system according to the first embodiment will be described with reference to FIG. 1. FIG. 1 is a pattern perspective view of the picking system according to the first embodiment. Hereinafter, an example of the picking system that includes two robots is explained. However, the number of robots of the picking system may be one or may be three or more.

As illustrated in FIG. 1, the picking system according to the first embodiment includes a conveyer 1, robots 2a, and 2b, and a camera 3. The conveyer 1 is a conveying device that conveys workpieces w placed on a transport path 11 from the upper stream side to the lower stream side. Herein, it is explained that the conveyer 1 is a belt conveyor. However, the conveyer 1 may be a conveying device other than the belt conveyor.

The robots 2a, and 2b, are an articulated robot that is fixed on a ceiling, a wall surface, a floor, or the like. The robots 2a, and 2b, perform a holding operation for holding the workpieces w conveyed by the conveyer 1 and a placement operation for moving the held workpieces w to place the workpieces on a predetermined place.

The robots 2a, and 2b, respectively include arm leading ends 21a, and 21b. Moreover, each of the arm leading ends 21a, and 21b, of the robots 2a, and 2b, includes an end effector that holds the workpieces w.

The end effector provided in the robot 2a includes a plurality of holding parts 23a, and 24a, and a supporting part 22a. The plurality of holding parts 23a and 24a, holds the workpieces w. The supporting part 22a, is rotatably provided against the arm leading end 21a, and supports the plurality of holding parts 23a, and 24a. Moreover, the end effector provided in the robot 2b includes a plurality of holding parts 23b, and 24b, that holds the workpieces w and a supporting part 22b, that is rotatably provided against the arm leading end 21b, and supports the plurality of holding parts 23b, and 24b.

The holding parts 23a, 23b, 24a, and 24b, are adsorption-type holding parts that adsorb the workpieces w by using a suction device such as a vacuum pump. The robots 2a, and 2b, hold the plurality of workpieces w by using the holding parts 23a, 23b, 24a, and 24b. Then, the robots 2a, and 2b, respectively move the held workpieces w onto conveyers 4a, and 4b, and then place the held plurality of workpieces w on the conveyers 4a, and 4b, by removing an attractive force by the suction device.

When the holding operation and the placement operation on the one workpiece w are completed, the robots 2a, and 2b, return to the initial posture set previously and start the holding operation on the next workpiece w from the initial posture. Herein, the robots 2a, and 2b according to the first embodiment respectively have different initial postures. This point is described below with reference to FIG. 4.

It is explained in the first embodiment that each of the robots 2a, and 2b, includes two holding parts. However, the number of holding parts of each of the robots 2a, and 2b, may be three or more.

Herein, it is explained that each of the robots 2a, and 2b, includes an adsorption part as an end effector. However, each of the robots 2a, and 2b, may include an end effector other than the adsorption part. For example, each of the robots 2a, and 2b, may include a hand-type end effector that grips the workpiece w.

It is explained in the first embodiment that a vertical articulated robot is employed as the robots 2a, and 2b. However, the robots 2a, and 2b, may be a robot other than the vertical articulated robot. In other words, the robots 2a, and 2b, may be a horizontal articulated robot, a parallel link robot, an orthogonal robot, or the like if they can hold and transfer the workpieces w.

Herein, it is explained that the robots 2a, and 2b are arranged while placing the transport path 11 therebetween. However, the robots 2a, and 2b, may be arranged side by side along the transport path 11 or may be arranged on the upper side of the transport path 11.

The camera 3 is an image capturing device that captures a predetermined region on the transport path 11 of the conveyer 1. The camera 3 is placed at the upper stream side of the conveyer 1 than the robots 2a, and 2b. An image captured by the camera 3 is output to a control device (not-illustrated) via a communication network such as a local area network (LAN).

In the picking system according to the first embodiment, the camera 3 captures the transport path 11, and the control device (not-illustrated) detects the workpieces w on the transport path 11 on the basis of the image captured by the camera 3 and also instructs the robots 2a, and 2b, to perform the holding operation on the detected workpieces w. Then, the robots 2a, and 2b, perform the holding operation and the placement operation in accordance with the instruction of the control device.

Herein, when a picking system makes a robot perform an operation for placing a plurality of workpieces after aligning the directions of the plurality of workpieces, the robot matches the direction of a holding part against the workpiece with a predetermined direction by rotating a supporting part that supports the holding part and then holds the workpiece.

Therefore, in the picking system, because a behavior for rotating the supporting part intervenes between the start of the holding operation for the workpiece and the hold of the workpiece performed by the holding part, it has been concerned that the time required until holding the workpiece gets longer. The longer the time required until holding a workpiece gets, the higher the possibility that interference with other robots on the conveyor device occurs becomes. For this reason, it is preferable that the time required until holding a workpiece is short.

Moreover, because a workpiece to be held by the robot is conveyed by the conveying device, the position of the workpiece changes from hour to hour. For this reason, in order to match the direction of the holding part against the workpiece with the predetermined direction, it is required that the operation of the robot is controlled in consideration of the conveyance speed of the conveying device. Therefore, there is a possibility that a computation process for the operation control of the robot is complicated. When the computation process for the operation control of the robot is complicated, there is a possibility that instructing the robot of the operation is delayed. As a result, there is a possibility that the work efficiency of the robot is degraded.

Therefore, in the picking system according to the first embodiment, the control device controls the robots 2a and 2b, to simply hold the workpieces w without considering the directions of the workpieces w when performing the holding operation and to place the held workpieces w after aligning its directions when performing the placement operation. Hereinafter, the configuration and operation of the control device will be specifically explained.

Figure 2:
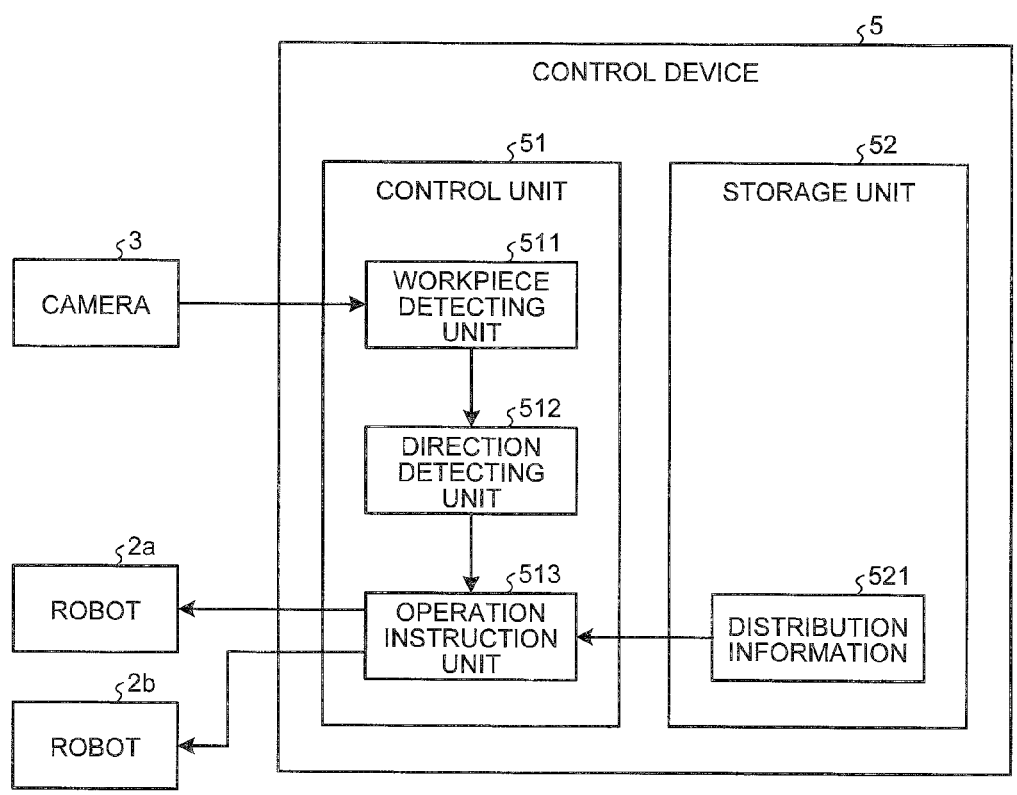
FIG. 2 is a block diagram illustrating the configuration of a control device according to the first embodiment.

FIG. 2 is a block diagram illustrating the configuration of a control device 5 according to the first embodiment. In FIG. 2, only components for the explanation of the characteristic of the control device are illustrated, and thus the descriptions on general components are omitted.

As illustrated in FIG. 2, the control device 5 includes a control unit 51 and a storage unit 52. Moreover, the control unit 51 includes a workpiece detecting unit 511, a direction detecting unit 512, and an operation instruction unit 513. Moreover, the storage unit 52 stores therein distribution information 521.

The control unit 51 totally controls the control device 5. The control unit 51 is constituted by a central processing unit (CPU) or a microprocessor, for example. The workpiece detecting unit 511 is a processing unit that detects the workpiece w on the transport path 11 on the basis of the image input from the camera 3. Moreover, upon detecting the workpiece w, the workpiece detecting unit 511 outputs, to the direction detecting unit 512, the image captured by the camera 3 and the detection result that includes the position information of the workpiece w.

The direction detecting unit 512 is a processing unit that detects the direction of the workpiece w on the basis of the image captured by the camera 3. Moreover, upon detecting the direction of the workpiece w, the direction detecting unit 512 outputs, to the operation instruction unit 513, a result that is obtained by adding the detection result of the direction of the workpiece w to the detection result of the workpiece w performed by the workpiece detecting unit 511.

The detection of the workpiece w performed by the workpiece detecting unit 511 and the detection of the direction of the workpiece w performed by the direction detecting unit 512 may be both performed by using a well-known technology. Herein, it has been explained that the detection process of the workpiece w and the detection process of the direction of the workpiece w are performed by different processing units. However, the processes may be together performed by one processing unit.

The operation instruction unit 513 is a processing unit that instructs the robots 2a, and 2b, to perform the holding operation and the placement operation of the workpiece w in accordance with the detection result of the workpiece w received from the direction detecting unit 512. The specific contents of the holding operation and the placement operation of the robots 2a, and 2b, that are executed by the instruction of the operation instruction unit 513 are described below with reference to FIG. 3.

The operation instruction unit 513 also performs a process for determining the workpiece w to be held by each of the robots 2a, and 2b, on the basis of the detection result of the workpiece w received from the direction detecting unit 512 and the distribution information 521 stored in the storage unit 52. This point is described below with reference to FIGS. 4 to 6.

The storage unit 52 is constituted by a storage device such as for example a nonvolatile memory and a hard disk drive. The storage unit 52 stores the distribution information 521. The distribution information 521 is information that is associated with the robots 2a, and 2b for each predetermined angular range.

Figure 3:
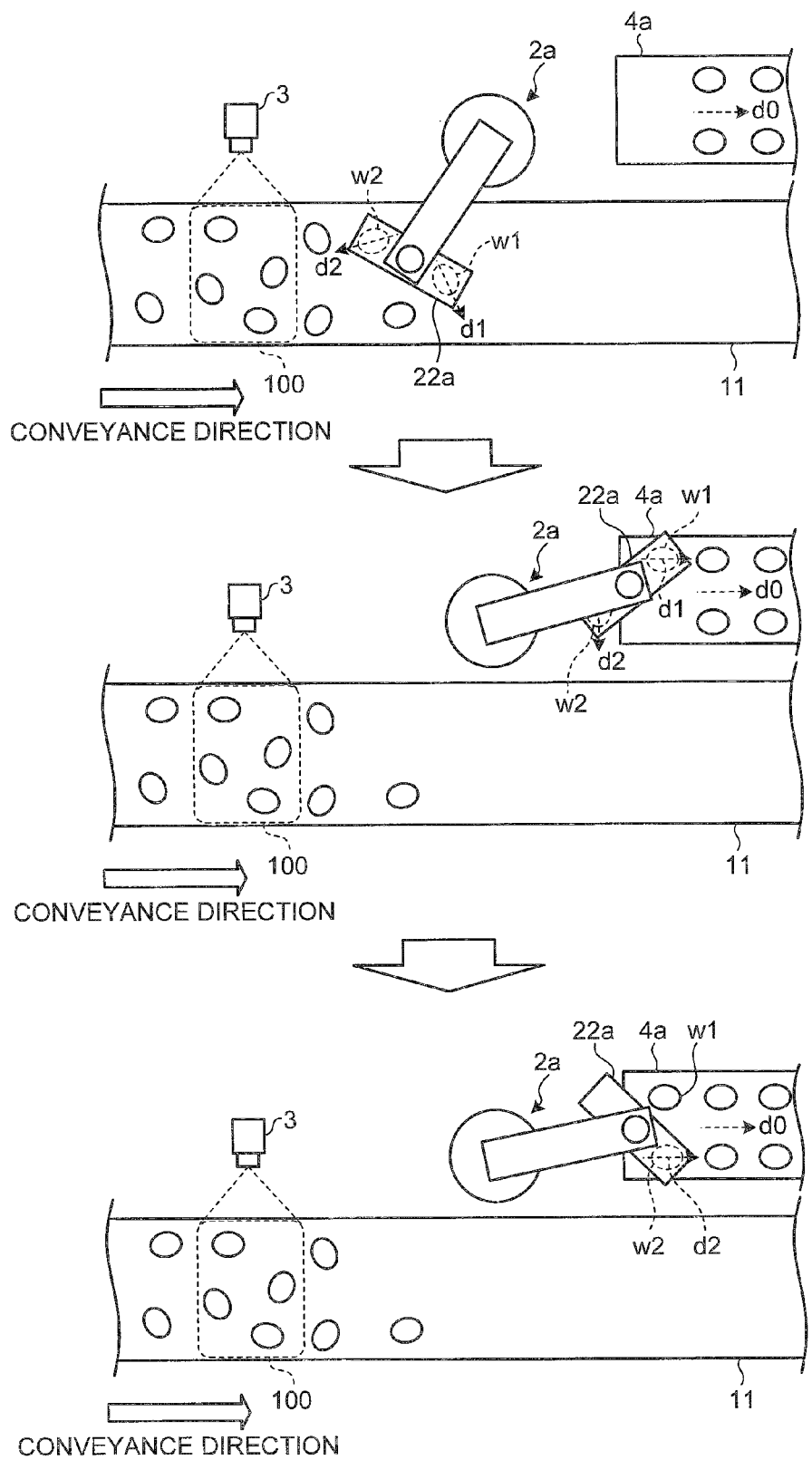
FIG. 3 is a diagram illustrating an operation example of the picking system according to the first embodiment.

Now, an operation example of the picking system according to the first embodiment is explained with reference to FIG. 3. FIG. 3 is a diagram illustrating an operation example of the picking system according to the first embodiment. As an example, a holding operation and a placement operation performed by the robot 2a, are illustrated in FIG. 3.

Assuming that the operation instruction unit 513 of the control device 5 instructs the robot 2a, to perform the holding operation on workpieces w1 and w2, the robot 2a performs the holding operation on the workpiece w1 and the workpiece w2 in accordance with the instruction of the operation instruction unit 513 as illustrated in the upper diagram of FIG. 3.

For example, the robot 2a, holds the workpiece w1 by using the holding part 24a, (see FIG. 1) and then holds the workpiece w2 by using the holding part 23a, (see FIG. 1). At this time, the robot 2a, performs the holding operation on the workpieces w1 and w2 without considering the direction of the holding part 24a, against the workpiece w1 and the direction of the holding part 23a, against the workpiece w2. Therefore, the robot 2a, can perform the operation for holding the workpieces w1 and w2 in a short time.

Next, the operation instruction unit 513 rotates the supporting part 22a, by a predetermined amount in such a manner that the direction of each of the workpieces w1 and w2 becomes a predetermined direction for each of the held workpieces w1 and w2 and then instructs the robot 2a, to execute the placement operation for placing each of the workpieces w1 and w2 on the conveyer 4a.

More specifically, on the basis of a direction d1 of the workpiece w1 detected by the direction detecting unit 512 and a predetermined reference placement direction d0, the operation instruction unit 513 computes a rotation amount of the supporting part 22a, required for matching and placing the workpiece w1 with the reference placement direction d0. Herein, it is assumed that the reference placement direction d0 is the same direction as the conveyance direction of the conveyer 4a.

Furthermore, in the case of the workpiece w2, the operation instruction unit 513 computes a rotation amount of the supporting part 22a, for matching and placing the workpiece w2 with the reference placement direction d0 on the basis of a direction d2 of the workpiece w2 and the predetermined reference placement direction d0. In addition, the computation of the rotation amount of the supporting part 22a, is performed in consideration of rotation amounts of other components of the robot 2a, in addition to the direction of the workpiece w and the reference placement direction.

Then, the operation instruction unit 513 instructs the robot 2a, to rotate the supporting part 22a, by the rotation amount computed for each of the workpieces w1 and w2.

As illustrated in the middle and lower diagrams of FIG. 3, the robot 2a, performs the placement operation on the workpieces w1 and w2 in accordance with the instruction of the operation instruction unit 513. First, as illustrated in the middle diagram of FIG. 3, the robot 2a rotates the supporting part 22a, by a predetermined amount to match the direction d1 of the workpiece w1 with the reference placement direction d0 and then places the workpiece w1 on the conveyer 4a. After that, as illustrated in the lower diagram of FIG. 3, the robot 2a rotates the supporting part 22a, by a predetermined amount to match the direction d2 of the workpiece w2 with the reference placement direction d0 and then places the workpiece w2 on the conveyer 4a.

In this way, the direction detecting unit 512 detects the directions of the workpieces w1 and w2 on the basis of the image captured by the camera 3, and the operation instruction unit 513 determines the rotation amounts of the supporting part 22a, on the basis of the detected directions. As a result, the robot 2a, can place the workpieces w1 and w2 on the conveyer 4a, in the state where the directions of the workpieces w1 and w2 conveyed in random directions are aligned.

Herein, to make the comprehension easy, it has been explained that execution instructions for the holding operation and the placement operation are performed at different times. The operation instruction unit 513 may perform a series of operations from the holding operation to the placement operation of the workpiece w at one time.

Figure 4:
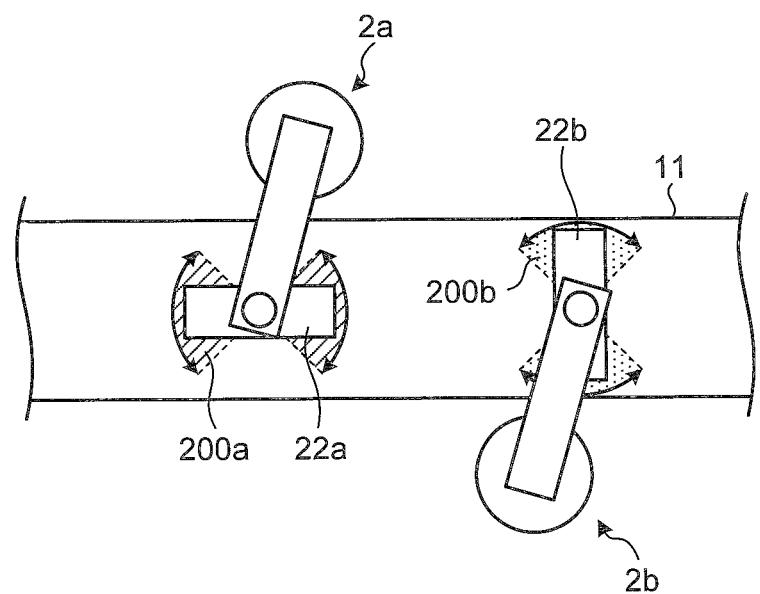
FIG. 4 is a diagram illustrating an example of an initial posture of each robot.

Next, the determination method of the workpiece w to be held by each of the robots 2a, and 2b, is explained with reference to FIGS. 4 to 6. First, an initial posture of each of the robots 2a, and 2b, is explained with reference to FIG. 4. FIG. 4 is a diagram illustrating an example of an initial posture of each of the robots 2a, and 2b.

As illustrated in FIG. 4, the robots 2a, and 2b have the respective different initial postures. For example, the robot 2a, has an initial posture in which the longitudinal direction of the supporting part 22a, (the arrangement direction of the holding parts 23a, and 24a) is the same direction as the conveyance direction of the conveyer 1. Moreover, the robot 2b, has an initial posture in which the longitudinal direction of the supporting part 22b, (the arrangement direction of the holding parts 23b, and 24b) is a direction that is vertical (90, degrees) to the conveyance direction of the conveyer 1.

As illustrated in FIG. 4, when it is assumed that the conveyance direction of the conveyer 1 is a reference direction (zero degree), the robot 2a, is associated with angular ranges 200a, of −45, degrees to +45, degrees, +135 degrees to +180, degrees, and −135, degrees to −180, degrees in accordance with the distribution information 521 (see FIG. 6 to be described below). Moreover, when it is assumed that the conveyance direction of the conveyer 1 is a reference direction (zero degree), the robot 2b, is associated with angular ranges 200b, of +45, degrees to +135degrees and −45, degrees to −135, degrees in accordance with the distribution information 521 (see FIG. 6 to be described below).

In this way, the distribution information 521 indicates that the predetermined angular ranges 200a, and 200b, that include angles formed by the directions of the supporting parts 22a, and 22b, and the reference direction when the robots 2a, and 2b, have the respective initial postures are associated with the robots 2a, and 2b. Hereinafter, the angular ranges associated with the robot 2a, are referred to as the first angular range 200a, and the angular ranges associated with to the robot 2b, are referred to as the second angular range 200b.

Herein, it has been explained that the conveyance direction of the conveyer 1 is the reference direction. However, the reference direction may be a direction other than the conveyance direction. Moreover, initial postures set for the robots 2a, and 2b, are not limited to the postures illustrated in FIG. 4.

Next, the determination process of the workpiece w to be held by each of the robots 2a, and 2b, is explained with reference to FIGS. 5 and 6. FIG. 5 is a diagram illustrating an example of a direction of the workpiece w that is detected by the direction detecting unit 512. FIG. 6 is an explanation diagram of a workpiece determination process. The case where workpieces w3 to w6 are included within an image area 100 (see FIG. 3) of the image captured by the camera 3 is illustrated in FIG. 5.

Figure 5:
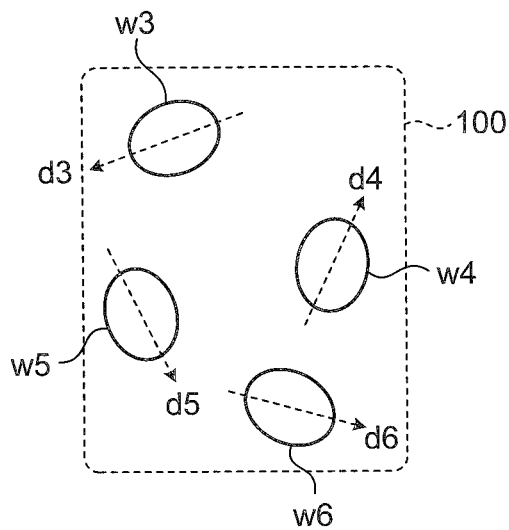
FIG. 5 is a diagram illustrating an example of a direction of a workpiece that is detected by a direction detecting unit.

As illustrated in FIG. 5, it is assumed that the workpieces w3 to w6 are captured by the camera 3 and are detected by the workpiece detecting unit 511. In this case, the direction detecting unit 512 detects directions d3 to d6 of the workpieces w3 to w6 detected by the workpiece detecting unit 511.

Next, the operation instruction unit 513 calculates angles formed by the directions d3 to d6 of the workpieces w3 to w6 detected by the direction detecting unit 512 and the reference direction (the conveyance direction of the conveyer 1 in the first embodiment), and instructs the robots 2a, and 2b, associated with the angular ranges including the calculated angles to perform the holding operation on the workpieces w3 to w6.

Figure 6:
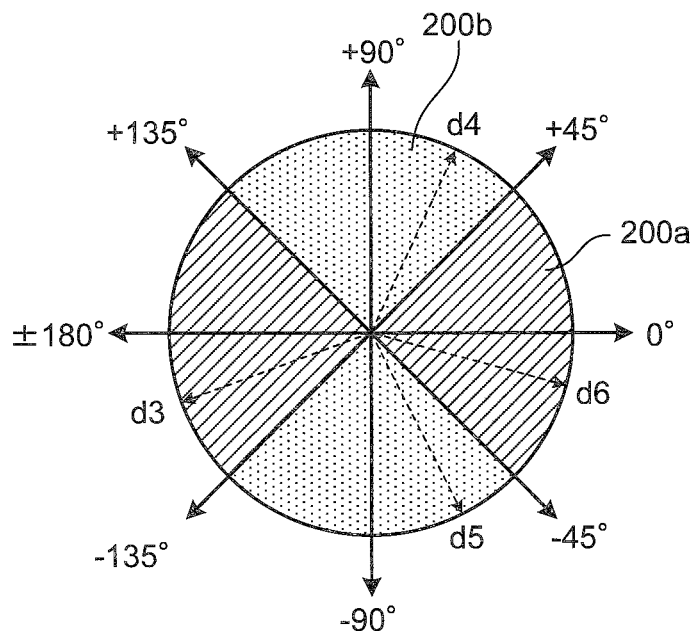
FIG. 6 is an explanation diagram of an example of a workpiece determination process.

For example, as illustrated in FIG. 6, the direction d3 of the workpiece w3 and the direction d6 of the workpieces w6 are included within the first angular range 200a, associated with the robot 2a. For this reason, the operation instruction unit 513 instructs the robot 2a to perform the holding operation and the placement operation on the workpieces w3 and w6.

Moreover, the direction d4 of the workpiece w4 and the direction d5 of the workpiece w5 are included within the second angular range 200b, associated with the robot 2b. For this reason, the operation instruction unit 513 instructs the robot 2b, to perform the holding operation and the placement operation on the workpieces w4 and w5.

In this way, the operation instruction unit 513 determines the workpiece w to be held by each of the robots 2a, and 2b, on the basis of the direction of the workpiece w detected by the direction detecting unit 512. In other words, the control device 5 detects the direction of the workpiece w on the basis of the image captured by the camera 3, and instructs the robots 2a, and 2b, corresponding to the direction of the detected workpiece w to perform the holding operation on the workpiece w.

More specifically, the control device 5 associates the robots 2a, and 2b, with the respective predetermined angular ranges, and instructs the robots 2a and 2b, which are associated with the respective angular ranges including the angles formed by the directions of the detected workpieces w and the predetermined reference direction, to perform the holding operation on the respective workpieces w. Therefore, a processing load is prevented from concentrating on one of the robots 2a, and 2b, and thus work efficiency can be raised. Moreover, because rotation amounts for rotating the supporting parts 22a, and 22b, can be reduced during the placement operation by making the robots 2a, and 2b, hold the respective workpieces w of which the directions are similar to the corresponding robots, the placement operation can be speeded up.

Figure 7:
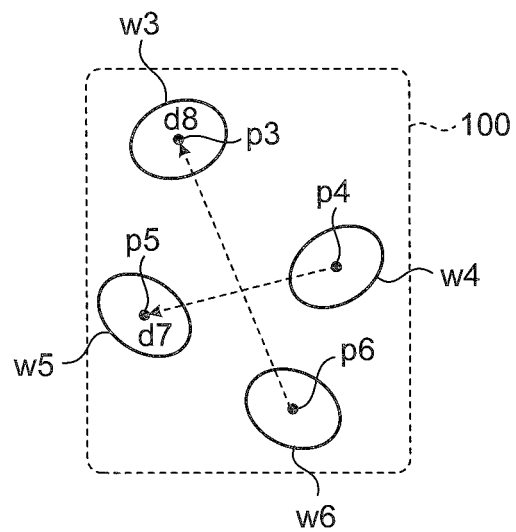
FIG. 7 is an explanation diagram of another example of the workpiece determination process.

Herein, it has been explained that priority is given to the speed-up of the placement operation. On the other hand, when priority is given to the speed-up of the holding operation, the robots 2a, and 2b, corresponding to the direction of a line(the line is virtual) linking the workpieces w may hold the two workpieces w linked by the line, for example. This point is explained with reference to FIG. 7. FIG. 7 is an explanation diagram of another example of the workpiece determination process.

As illustrated in FIG. 7, the direction detecting unit 512 detects a direction d7 of a line linking a centroid p4 of the workpiece w4 and a centroid p5 of the workpiece w5 and a direction d8 of a line linking a centroid p3 of the workpiece w3 and a centroid p6 of the workpieces w6.

Next, the operation instruction unit 513 calculates angles formed by the directions d7 and d8 detected by the direction detecting unit 512 and the reference direction (the conveyance direction of the conveyer 1), and instructs the robots 2a, and 2b, associated with the respective angular ranges including the calculated angles to perform the holding operation on the workpieces w3 to w6.

For example, as illustrated in FIG. 7, the direction d7 is included within the first angular range 200a, (see FIG. 6) associated with the robot 2a. For this reason, the operation instruction unit 513 instructs the robot 2a, to perform the holding operation and the placement operation on the workpieces w4 and w5. Moreover, the direction d8 is included within the second angular range 200b, (see FIG. 6) associated with the robot 2b. For this reason, the operation instruction unit 513 instructs the robot 2b, to perform the holding operation and the placement operation on the workpieces w3 and w6.

In this way, the control device 5 detects the direction of the line linking the workpieces w on the basis of the image captured by the camera 3, and instructs the robots 2a, and 2b, corresponding to the detected direction to perform the holding operation on the workpieces w linked by the line. More specifically, the control device 5 previously associates the predetermined angular ranges, which include the angles formed by the predetermined reference direction and the directions of the supporting parts 22a, and 22b, when the robots 2a, and 2b, have the respective initial postures, with the robots 2a, and 2b. Then, the control device 5 instructs the robots 2a, and 2b, which are associated with the angular range including the angle formed by the direction of the line linking the workpieces w and the predetermined reference direction, to perform the holding operation on the workpieces w.

As a result, when each of the robots 2a, and 2b holds the workpieces w, rotation amounts for rotating the supporting parts 22a, and 22b, can be reduced. In other words, because each of the robots 2a, and 2b, holds the workpieces w that have the postures to be easily held by the corresponding robot, the holding operation can be speeded up.

The direction detecting unit 512 detects the directions of a line linking the workpieces w3 and w5 and a line linking the workpieces w4 and w6, in addition to the direction d7 of the line linking the workpieces w4 and w5 and the direction d8 of the line linking the workpieces w3 and w6.

At this time, when the workpieces w3 to w6 to be held by the robots 2a, and 2b, are determined on the basis of the direction of the line linking the workpieces w3 and w5 and the direction of the line linking the workpieces w4 and w6, for example, the robot 2b, holds all the workpieces w3 to w6. On the other hand, when the workpieces w3 to w6 are determined on the basis of the direction of the line linking the workpieces w5 and w6 and the direction of the line linking the workpieces w3 and w4, the robot 2a, holds all the workpieces w3 to w6. In other words, the operations concentrate on one of the robots 2a, and 2b.

For this reason, in order to prevent the operations from concentrating on one of the robots 2a, and 2b, the operation instruction unit 513 determines the workpieces w3 to w6 to be held by the robots 2a, and 2b, on the basis of the direction d7 of the line linking the workpieces w4 and w5 and the direction d8 of the line linking the workpieces w3 and w6. More specifically, it is only necessary that the operation instruction unit 513 selects lines linking the workpieces w in such a manner that the difference between the number of lines included within the first angular range 200a, and the number of lines included within the second angular range 200b, is the minimum.

Herein, it has been explained that the direction of the line linking the workpieces w faces from the workpiece w located at the downstream side toward the workpiece w located at the upstream side. However, the direction of the line linking the workpieces w may be a direction that faces from the workpiece w located at the upstream side toward the workpiece w located at the downstream side.

Herein, it has been explained that the centroids of the workpieces w are linked. However, any points other than the centroids may be linked.

As described above, it has been explained in the first embodiment that the robot includes the plurality of holding parts that holds workpieces and the supporting part that is rotatably provided against the arm leading end and supports the plurality of holding parts. Moreover, it has been explained in the first embodiment that the control device instructs the robot to rotate the supporting part by the predetermined amount in such a manner that the directions of the workpieces become the predetermined direction for the workpieces held by the holding parts and then to perform the placement operation for placing the workpieces on the predetermined place. Therefore, when placing the plurality of workpieces after aligning their directions, the holding operation of the plurality of workpieces can be performed in a short time.

Second Embodiment

Next, the second embodiment will be explained. It has been explained in the first embodiment that the directions of the held workpieces w are matched with the reference placement direction by rotating the supporting parts 22a and 22b. However, the matching method of the directions of the workpieces w is not limited to this. For example, the directions of the held workpieces w may be aligned by rotating the holding parts.

Hereinafter, the configuration and operation of holding parts according to the second embodiment are explained with reference to FIGS. 8A to 9B. FIGS. 8A to 9B are enlarged pattern views illustrating the vicinity of an arm leading end of a robot according to the second embodiment.

Figure 8A:
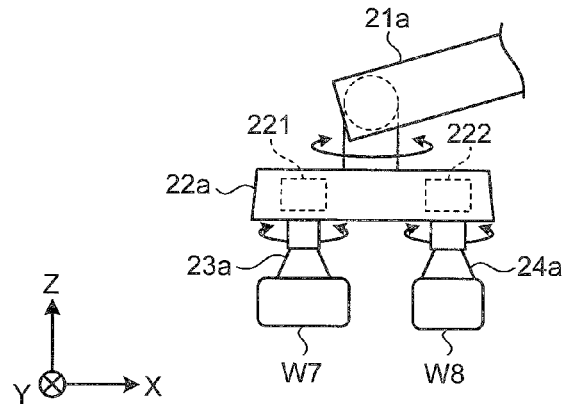
FIGS. 8A, 8B, 9A, and 9B are enlarged pattern views illustrating the vicinity of an arm leading end of a robot according to a second embodiment.
Figure 8B:
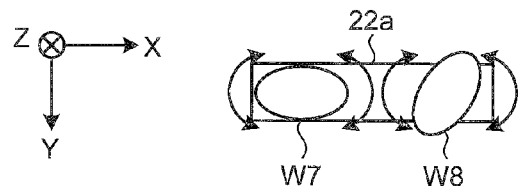
Figure 9A:
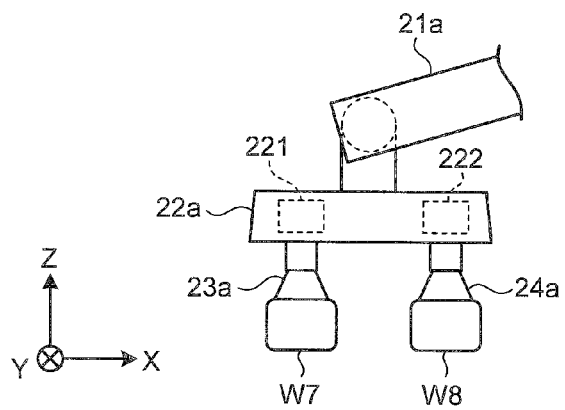
Figure 9B:
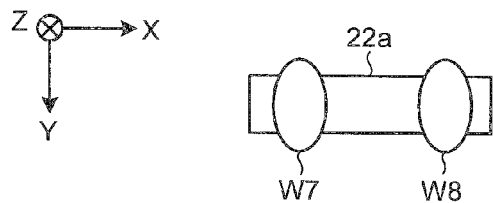

FIGS. 9A and 9B are diagrams illustrating a state where the directions of workpieces w7 and w8 are matched with a reference placement direction by rotating the holding parts 23a, and 24a, from the state illustrated in FIGS. 8A and 8B. FIG. 8B is a diagram illustrating the supporting part 22a, and the workpieces w7 and w8 illustrated in FIG. 8A when being viewed from the negative direction of Z-axis. FIG. 9B is a diagram illustrating the supporting part 22a, and the workpieces w7 and w8 illustrated in FIG. 9A when being viewed from the negative direction of Z-axis. The same following descriptions as those explained already have the same reference numbers, and the overlapping explanations are omitted.

As illustrated in FIG. 8A, in the robot according to the second embodiment, the holding parts 23a, and 24a, are rotatably supported against the supporting part 22a. Moreover, the robot according to the second embodiment includes a driving unit 221 that rotates the holding part 23a, against the supporting part 22a, and a driving unit 222 that rotates the holding part 24a, against the supporting part 22a. These driving units 221 and 222 are constituted by a motor, for example.

A control device according to the second embodiment drives the driving units 221 and 222 of the holding parts 23a, and 24a, in such a manner that the directions of the workpieces w7 and w8 respectively held by the holding parts 23a, and 24a, become a predetermined direction. More specifically, the control device according to the second embodiment detects the directions of the workpieces w7 and w8 on the basis of the image captured by the camera 3, and determines the rotation amount of the supporting part 22a, and the driving amounts of the driving units 221 and 222 of the holding parts 23a, and 24a, on the basis of the detected directions.

Then, the control device according to the second embodiment instructs the robot to rotate the supporting part 22a, by the determined rotation amount and also to drive the driving units 221 and 222 of the holding parts 23a, and 24a, by the determined driving amounts, between the hold of the workpieces w7 and w8 and the completion of placement of the held workpieces w7 and w8 on the conveyer 4a.

As a result, the robot according to the second embodiment rotates the supporting part 22a, and drives the driving units 221 and 222 of the holding parts 23a, and 24a. In other words, the robot according to the second embodiment rotates the holding parts 23a, and 24a. As a result, the workpieces w7 and w8 that are held in random directions are aligned in accordance with the rotations of the holding parts 23a, and 24a, during moving them onto the conveyer 4a, (see FIGS. 9A and 9B), and are placed on the conveyer 4a, in the state where their directions are matched with the reference placement direction.

In this way, the robot of the second embodiment further includes the driving units that rotate the holding parts against the supporting part. The control device instructs the robot to drive the driving units in addition to the supporting part in such a manner that the directions of the workpieces held by the holding parts become the predetermined direction and to perform the placement operation for placing the workpieces on the predetermined place. As a result, the placement operation of the workpieces can be quickly performed. Moreover, the operation of the robot may not be changed to align the directions of the workpieces.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A picking system comprising:
    a conveying device that is configured to convey workpieces;
    a robot that is configured to perform a holding operation for holding the workpieces conveyed by the conveying device and a placement operation for moving the held workpieces to place the workpieces on a predetermined place;
    an image capturing device that is configured to capture a transport path of the conveying device; and
    a control device that is configured to instruct the robot to perform the holding operation and the placement operation, wherein
    the robot includes:
        a plurality of holding parts that is configured to hold the workpieces; and
        a supporting part that is rotatably provided against an arm to support the plurality of holding parts, and
    the control device is configured to detect a direction of a line linking the workpieces on the basis of an image captured by the image capturing device to determine the workpieces to be held by the robot on the basis of the detected direction, and to instruct the robot to rotate the supporting part by a predetermined amount in such a manner that a direction of the workpiece becomes a predetermined direction for each workpiece held by the holding parts, and then to perform the placement operation for placing the workpiece on the predetermined place.

2. The picking system according to claim 1, wherein
    the robot further includes driving units that rotate the holding parts against the supporting part, and
    the control device instructs the robot to further drive the driving units in addition to the rotation of the supporting part in such a manner that directions of the workpieces held by the holding parts become the predetermined direction and then to perform the placement operation for placing the workpieces on the predetermined place.

3. The picking system according to claim 1, wherein
    the control device detects a direction of the workpiece on the basis of the image captured by the image capturing device and determines a rotation amount of the supporting part on the basis of the detected direction.

4. The picking system according to claim 3, wherein the robot further includes driving units that rotate the holding parts against the supporting part, and
the control device instructs the robot to further drive the driving units in addition to the rotation of the supporting part in such a manner that directions of the workpieces held by the holding parts become the predetermined direction and then to perform the placement operation for placing the workpieces on the predetermined place.

5. A picking system comprising:
a conveying means for conveying workpieces;
a robot that performs a holding operation for holding the workpieces conveyed by the conveying means and a placement operation for moving the held workpieces to place the workpieces on a predetermined place;
an image capturing means for capturing a transport path of the conveying device; and
a control means for instructing the robot to perform the holding operation and the placement operation, wherein the robot includes:
a plurality of holding means for holding the workpieces; and
a supporting means that is rotatably provided against an arm for supporting the plurality of holding means, and
the control means is configured to detect a direction of a line linking the workpieces on the basis of an image captured by the image capturing means to determine the workpieces to be held by the robot on the basis of the detected direction, and to instruct the robot to rotate the supporting means by a predetermined amount in such a manner that a direction of the workpiece becomes a predetermined direction for each the workpiece held by the holding means, and then to perform the placement operation for placing the workpiece on the predetermined place.

* * * * *